(12) United States Patent
Lee et al.

(10) Patent No.: US 8,617,735 B2
(45) Date of Patent: Dec. 31, 2013

(54) BATTERY MODULE HAVING IMPROVED COOLING EFFICIENCY

(75) Inventors: Gun-Goo Lee, Yongin-si (KR);
Tae-Yong Kim, Yongin-si (KR);
Yoon-Cheol Jeon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1301 days.

(21) Appl. No.: 11/497,573

(22) Filed: Jul. 31, 2006

(65) Prior Publication Data

US 2007/0031728 A1 Feb. 8, 2007

(30) Foreign Application Priority Data

Jul. 29, 2005 (KR) .................. 10-2005-0069489
Jul. 29, 2005 (KR) .................. 10-2005-0069490

(51) Int. Cl.
*H01M 10/50* (2006.01)

(52) U.S. Cl.
USPC .................. 429/120; 429/148; 429/150

(58) Field of Classification Search
USPC .................................................. 429/120
See application file for complete search history.

(56) References Cited

U.S. PATENT DOCUMENTS

| | | | |
|---|---|---|---|
| 5,428,503 A * | 6/1995 | Matsushima et al. | 361/695 |
| 6,949,309 B2 * | 9/2005 | Moores et al. | 429/50 |
| 2002/0102454 A1 | 8/2002 | Zhou et al. | |
| 2005/0153199 A1 * | 7/2005 | Yagi et al. | 429/148 |
| 2005/0287426 A1 * | 12/2005 | Kim et al. | 429/149 |

FOREIGN PATENT DOCUMENTS

| | | |
|---|---|---|
| CN | 1638185 A | 7/2005 |
| EP | 1 174 942 A1 | 1/2002 |
| EP | 1 376 733 A2 | 1/2004 |
| EP | 1 548 858 A2 | 6/2005 |
| JP | 60-160469 U | 10/1985 |
| JP | 08-321329 * | 12/1996 |
| JP | 10-255859 A | 9/1998 |
| JP | 2000-67934 | 3/2000 |
| JP | 2000-067934 A | 3/2000 |
| JP | 2002-231322 | 8/2002 |
| JP | 2003-007355 * | 1/2003 |
| JP | 2003-036878 | 2/2003 |
| JP | 2004-006089 | 1/2004 |
| JP | 2004-071394 | 3/2004 |
| KR | 10-2005-0123483 | 12/2005 |
| KR | 10-2006-0037605 | 5/2006 |
| KR | 10-2006-0060804 | 6/2006 |
| KR | 10-2006-0101670 | 9/2006 |

OTHER PUBLICATIONS

Korean Patent Abstracts, Publication No. 1020050123483 A; Date of Publication: Dec. 29, 2005; in the name of Tae Yong Kim.

(Continued)

*Primary Examiner* — Ula C Ruddock
*Assistant Examiner* — Jacob Marks
(74) *Attorney, Agent, or Firm* — Christie, Parker & Hale, LLP (57) ABSTRACT

A battery module includes one or more cell assemblies with a plurality of unit cells, and a housing for mounting the cell assemblies therein and circulating a temperature control cooling medium through the cell assemblies. The cell assemblies are arranged in the longitudinal direction of the housing. A guidance unit is installed in a cooling medium passage formed in the longitudinal direction of the housing, and proceeds along the passage to guide cooling medium flow along the passage toward the cell assemblies.

18 Claims, 9 Drawing Sheets

(56) References Cited

OTHER PUBLICATIONS

Korean Patent Abstracts, Publication No. 1020060037605 A; Date of Publication: May 3, 2006; in the name of Se Wook Seo.
Korean Patent Abstracts, Publication No. 1020060060804 A; Date of Publication: Jun. 5, 2006; in the name of Tae Yong Kim et al.
European Search Report dated Nov. 16, 2006, for 06118138.4, in the name of Samsung SDI Co., Ltd.
Patent Abstracts of Japan, Publication No. 2000-067934, dated Mar. 3, 2000, in the name of Hisahi Kiba.
Korean Patent Abstracts, Publication No. 10-2006-0101670, dated Sep. 26, 2006, in the name of Gun-Gu Lee et al.
Patent Abstracts of Japan, Publication No. 2000-067934, dated Mar. 3, 2000, in the name of Hisashi Kiba.
Japanese Office action dated Mar. 23, 2010, for corresponding Japanese Patent application 2006-206728.

* cited by examiner

BATTERY MODULE HAVING IMPROVED COOLING EFFICIENCY

CROSS-REFERENCES TO RELATED APPLICATION

This application claims priority to and the benefit of Korean Patent Application Nos. 10-2005-0069489 and 10-2005-0069490 filed on Jul. 29, 2005, both applications filed in the Korean Intellectual Property Office, the entire contents of which are incorporated herein by reference.

BACKGROUND OF THE INVENTION

1. Field of the Invention

The present invention relates to a battery module in which cooling efficiency of unit rechargeable battery cells is improved.

2. Description of Related Art

A rechargeable battery may be formed with various shapes, such as a cylindrical shape and a prismatic shape. In order to drive a motor for the electric vehicle requiring high electrical power, a plurality of rechargeable battery cells are serially connected to each other to thereby form a high-capacity rechargeable battery module.

A rechargeable battery module is typically constructed by serially interconnecting a plurality of rechargeable battery cells (referred to simply as the "unit cells").

The respective unit cells each include an electrode assembly with positive and negative electrode plates between which a separator is interposed. A case mounts the electrode assembly therein. A cap assembly is fitted to the case to seal it, and positive and negative electrode terminals are electrically connected to current collectors of the positive and the negative electrode plates of the electrode assembly.

With the usual prismatic batteries, the respective unit cells are arranged such that the positive and the negative electrode terminals thereof protrude from the top of the cap assembly and alternate with those of a neighboring unit cell. A conductor interconnects the screwed negative and positive electrode terminals via a nut, thereby constructing a battery module.

Since the battery module is typically constructed by interconnecting several to several tens of unit cells, the heat generated at the respective unit cells needs to be effectively dissipated such that the temperature difference between locations of the respective unit cells within the battery module is minimized to avoid deteriorating the battery capacity.

When heat dissipation is not done effectively, the temperature deviation between the respective unit cells deteriorates the battery charge/discharge efficiency. The internal temperature of the battery can be elevated as a result of the heat generated from the unit cells so that not only is the battery capacity deteriorated, but in a severe case, the battery can explode.

Further, when the battery module is used to drive a motor for an electronic washer, an electric scooter or a vehicle (an electric vehicle or a hybrid electric vehicle), it is charged and discharged by a high electric current so that the internal temperature may be elevated a considerable degree due to the heat generated by the internal reaction of the unit cells during usage. This can badly affect the battery characteristics, and deteriorates the inherent battery capacity. Accordingly, it becomes important for high capacity battery modules that their construction provides for appropriate heat dissipation.

SUMMARY OF THE INVENTION

The present invention provides a battery module which improves the cooling medium circulation structure to exert enhanced temperature control and minimize inter-unit cell temperature deviation.

According to an exemplary embodiment of the present invention, the battery module includes one or more cell assemblies with a plurality of unit cells, and a housing for mounting the cell assemblies therein and circulating a temperature control cooling medium through the cell assemblies.

The cell assemblies are arranged in the longitudinal direction of the housing. A guidance unit is installed in a cooling medium passage formed in the longitudinal direction of the housing, and proceeds along the passage to guide the cooling medium flow along the passage toward the cell assemblies.

The guidance unit may be placed in the passage for inflowing the cooling medium.

Accordingly, the cooling medium flow along the passage is guided by the guidance unit to the cell assemblies so that a sufficient amount of the cooling medium circulates through the inlet hole-sided unit cells of the cell assemblies, thereby reducing further the temperature of the inlet hole-sided unit cells.

Within the battery module a pair of the cell assemblies may face each other. In this case, the respective cell assemblies are placed on the same plane within the housing, and share a cooling medium passage formed at the center of the housing.

Furthermore, the cell assembly includes barriers disposed between the unit cell neighbors. The respective unit cells may be formed with a prismatic shape.

The battery module may belong to the blower type where the cooling medium is forcefully blown to the inside of the housing through an inlet hole formed at the housing.

When the battery module belongs to the blower type, the guide unit may be formed in the cooling medium inflow passage of the housing.

Furthermore, the housing may include inlet and outlet holes formed at both ends of the housing to introduce the cooling medium and discharge the cooling medium circulated through the respective unit cells, and inlet and outlet passages internally formed at both sides of the cell assembly such that the inlet and the outlet passages are communicated with the inlet and the outlet holes.

The cooling medium introduced from the inlet hole flows in along the inlet passage, and passes through the cell assemblies, followed by flowing out along the outlet passage and being discharged to the outside via the outlet hole.

The formation location of the inlet and the outlet holes for determining the directions of introducing and discharging the cooling medium is not limited thereto. The inlet and the outlet holes may be formed in the same direction.

When a pair of the cell assemblies face each other within the housing, it is preferable that an inlet hole may be formed at the one-sided end center of the housing such that the cooling medium is introduced into the center area between the cell assemblies facing each other via the inlet hole, and an outlet hole may be formed at both sides of the opposite-sided end of the housing.

The inlet and the outlet holes may be differentiated in the function thereof depending upon the cooling medium circulation type of the battery module.

The guidance unit may be installed in the inlet passage of the housing.

The guidance unit may include a guide plate installed in the longitudinal direction of the cooling medium passage with a predetermined length, and have protrusions protruding from the lateral surfaces of the guide plate toward the cell assemblies and spaced apart from each other.

Accordingly, the cooling medium is evenly guided and distributed to the respective unit cells due to the guide plate and the protrusions of the guidance unit so that the heat generated from the respective unit cells of the cell assemblies may be uniformly dissipated irrespective of the installation location thereof.

The guide plate of the guidance unit is placed in-between both end portions of the cell assembly arranged in the longitudinal direction of the housing.

The thickness of the guide plate and the protrusion may be in the range of 25-35% of the sectional width of the cooling medium passage.

The protrusions may be formed along the guide plate such that the protrusions are aligned to the edge end line of the unit cells of the cell assemblies directed toward inflow side receiving the cooling medium.

The formation location of the side protrusions is not limited to the above structure, and the protrusion may be placed in-between the unit cell neighbors.

The protrusions may proceed substantially perpendicular to the guide plate longitudinally proceeding along the passage.

The protrusions may be at an oblique angle to the guide plate longitudinally proceeding along the passage at an angle.

The protrusions may be inclined obliquely from the guide plate at an inclination angle in the direction of flow of the cooling medium.

The guidance unit may have side protrusions protruded from the cell assemblies contacting the passage toward the passage.

The side protrusions may be substantially perpendicular to the direction of flow of the cooling medium, and tightly adhered to the cell assemblies contacting the passage. The side protrusions may protrude toward the passage.

Accordingly, the cooling medium is evenly guided and distributed to the respective unit cells due to the side protrusions so that the heat generated from the respective unit cells of the cell assemblies may be uniformly dissipated irrespective of the installation location thereof.

The protruding degree of the side protrusion with respect to the width direction of the cooling medium passage may be in the range of 25-35% of the sectional width of the cooling medium passage.

The side protrusions are arranged along the cooling medium passage, and spaced apart from each other. The side protrusions may be positioned corresponding to the respective unit cells of the cell assemblies.

The side protrusion may be aligned to the edge end line of the unit cell of the cell assembly directed toward the inflow side receiving the cooling medium.

The side protrusions may protrude substantially perpendicular to the flow direction of the cooling medium flow along the cooling medium passage.

Furthermore, the side protrusions may be inclined with respect to the flow direction of the cooling medium flow along the cooling medium passage.

The side protrusions at an oblique inclination angle in the direction of flow of the cooling medium.

The battery module may be used to drive a motor for a hybrid electric vehicle (HEV), an electric vehicle (EV), a wireless washer, an electric bicycle, an electric scooter, etc.

DETAILED DESCRIPTION

In the following description, although air is used as the cooling medium (coolant) for a battery module, the present invention is not limited to the use of air. Cooling water or other fluids may be used as the cooling medium.

Figure 1:
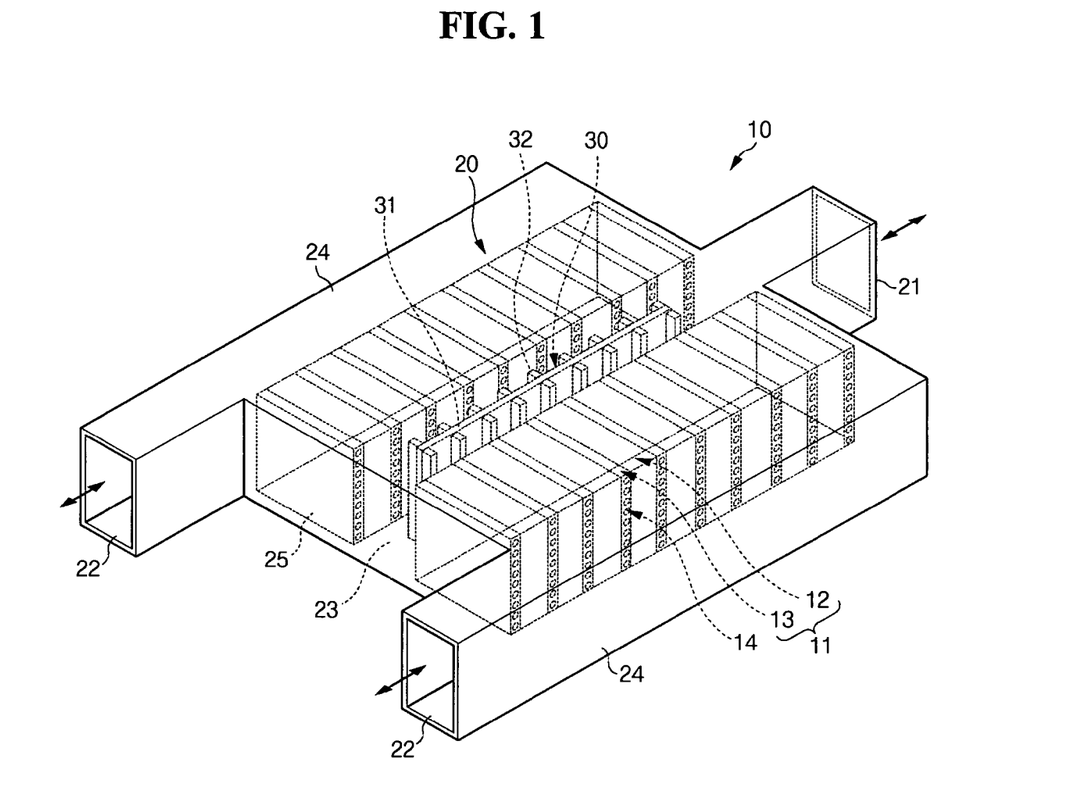
FIG. 1 is a schematic perspective view of a battery module according to a first embodiment of the present invention.

With reference to FIG. 1, the battery module 10 includes cell assemblies 11 each with a plurality of unit cells 12 sequentially arranged (stacked) forming a row of cells. A housing 20 mounts the cell assemblies 11 therein to circulate the temperature control air through the respective unit cells 12.

The respective unit cells 12 have a common rechargeable cell structure for charging and discharging by a predetermined amount of electric power, which has an electrode group with positive and negative electrode plates with a separator interposed therebetween.

In this embodiment, the cell assembly 11 is formed by laminating the unit cells 12, which are roughly rectangular-shaped with a pair of long sides and a pair of short sides while having an extended longitudinal width.

Specifically, one or more cell assemblies 11 are mounted within the housing 20. In this embodiment, a pair of cell assemblies are placed on the same plane while facing each other at a distance.

The placing of the cell assemblies 11 on the same plane within the housing 20 can minimize the overall height of the battery module 10.

A cell barrier 13 is provided between the neighboring unit cells 12 as well as external to the outermost unit cells 12 to space the respective unit cells 12 from each other at a predetermined distance while circulating the temperature control air through the cell barrier. The cell barrier 13 also supports the lateral sides of the respective unit cells 12.

Channels 14 are formed at the respective barriers 13 to circulate cooling air at a relatively low temperature through the unit cells 12, and control the temperature thereof. In this embodiment, the channels 14 are shown as holes which penetrate through the barrier 13. However, the channels merely function to circulate the temperature control air, and hence, are not limited to any specific structure.

With the battery module 10, the housing 20 mounts the cell assemblies 11 therein, and circulates the temperature control air through the channels 14 between the respective unit cells 12 of the cell assemblies 11, thereby dissipating the heat generated from the respective unit cells 12.

For this purpose, in this embodiment the housing 20 includes unit cell fixation receptors 25 for fixedly receiving the cell assemblies 11. Air passage 23 is formed at the center of the housing 20 between the pair of cell assemblies 11. Air passages 24 are formed at both sides of the housing 20 external to the respective cell assemblies 11 to circulate the temperature control air. Depending upon whether the relevant battery module is a blower type or a suction type, or the direction of flow of the cooling medium, the passages might be determined in the function thereof to take the inflow or outflow of the cooling medium. An inlet hole 21 is connected to the passage 23 to introduce the temperature control air and outlet holes 22 are connected to passages 24 to discharge the temperature control air.

Explanation will be now made with the case of a blower type, in which an air inlet 23 for in-flowing the temperature control air is placed at the center of the housing 20, and air outlets 24 for out-flowing the temperature control air are placed at both sides of the housing 20 together with the outlet holes 22, while the air is blown through the inlet hole 21 connected to the air inlet 23.

The unit cell receptor 25 has a space for fixedly accommodating the cell assembly 11. The unit cell receptors 25 are placed at both sides of the air inlet 23, and the pair of cell assemblies 11 are mounted at the relevant unit cell receptors 25 in the longitudinal direction of the housing 20, respectively.

The air inlet 23 is placed at the center of the housing 20 between the cell assemblies 11 such that it communicates with the inlet hole 21 formed at the housing 20. The air outlets 24 are placed external to the respective cell assemblies 11 at both inner sides of the housing 20 such that they communicate with the outlet holes 22 placed along the flow of the temperature control air.

Accordingly, the temperature control air enters the air inlet 23 formed at the center of the housing 20 via the inlet hole 21, and passes through the barriers 13 between the unit cells 12 of the respective cell assemblies 11 arranged along the air inlet 23 toward the air outlets 24, and then are discharged to the outside of the housing 20 via the outlet hole 22.

The housing 20 has a guidance unit 30 installed along the air inlet 23 to guide the temperature control air flow along the air inlet 23 toward the cell assemblies 11.

The guidance unit 30 will be now specifically explained with reference to FIGS. 2 and 3.

The guidance unit 30 may be formed with a plate structure, which is located at the internal center of the air inlet 23 in the longitudinal direction thereof. The guidance unit 30 has a flat guide plate 31, and protrusions 32 protruding from both lateral surfaces of the guide plate 31 toward the respective cell assemblies 11. The protrusions 32 are spaced apart from each other.

With the guidance unit, the guide plate 31 proceeds substantially parallel to the stacking direction of the unit cells in the cell assemblies 11, while the protrusions 32 proceed from to the guide plate 31 toward the cell assemblies 11.

In one embodiment, the sectional area of the air inlet 23 within the installation sector of the guidance unit may be reduced to be smaller than that of the air inlet 23 with no guidance unit. Moreover, within the installation sector of the protrusions 32 of the guidance unit, the sectional area of the air inlet 23 may be further reduced.

Accordingly, the cooling air introduced from the inlet hole 21 is bisected by the guide plate 31, and the coolant flow is interrupted by the protrusions 32. The coolant then circulates through the unit cells 12 of the cell assemblies 11 placed at both sides of the air inlet 23.

An amount of cooling air may be forcefully guided to the inlet hole-sided unit so that those inlet hole-sided unit cells are cooled sufficiently by way of the cooling air guided by the guidance unit 30. Consequently, the inter-unit cells temperature deviation and local temperature elevation of the cell assemblies are minimized.

The guide plate 31 and the protrusions 32 of the guidance unit 30 are not limited in thickness. The sum thickness D2 of the guide plate 31 and the protrusions 32 in the width direction of the guide plate 31 in one exemplary embodiment is established to be 25-35% of the sectional width D1 of the air inlet 23.

When the thickness of the guidance unit 30 is less than 25% of the sectional width of the air inlet 23, it is difficult to guide the cooling air to the inlet hole-sided unit cells 12. By contrast, when the thickness of the guidance unit 30 exceeds 35% of the sectional width of the air inlet 23, the cooling air does not flow fluently.

The protrusions 32 protruding from the guide plate 31 merely interrupt the flow of the cooling air and guide it to the cell assemblies 11. Therefore, the thickness of the protrusions 32 in the longitudinal direction of the guide plate 31 is not limited to any specific dimensions.

The guide plate 31 of the guidance unit 30 is placed in-between the inlet hole-sided end of the air inlet 23 and the opposite inner end thereof except for the end portions.

Figure 2:
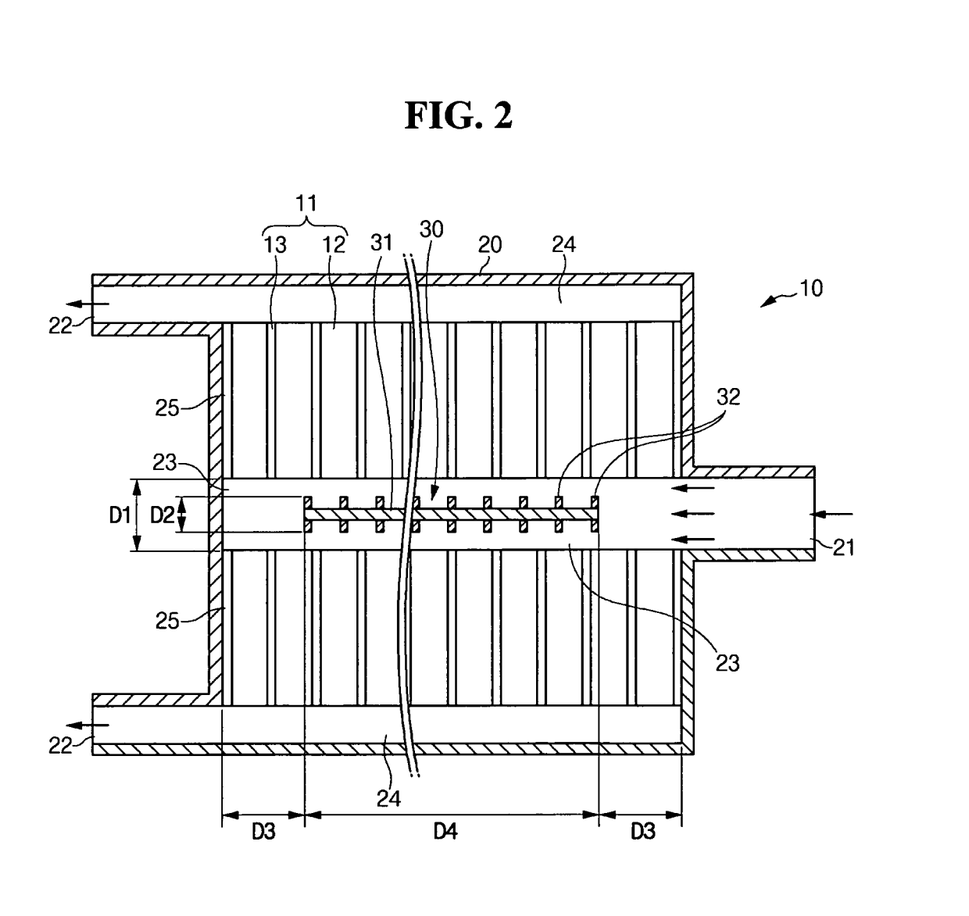
FIG. 2 is a schematic plan elevation view of the battery module according to the first embodiment of the present invention.

For example, as shown in FIG. 2, in case the number of the unit cells 12 of the one-sided cell assembly 11 amounts to twenty (20), the sector D4 of the guide plate 31 corresponds to the sector of the fourteen (14) unit cells 11 except for the sector D3 of the inlet hole-sided three (3) unit cells 11 and the sector D3 of the opposite inner end-sided three (3) unit cells 11.

That is, based on the direction of flow of the cooling medium, the guide plate 31 is placed at the sector D4 of the central fourth to sixteenth unit cells except for the sector D3 of the front-sided first to third unit cells, and the sector D3 of the rear-sided seventeenth to twentieth unit cells.

Figure 3:
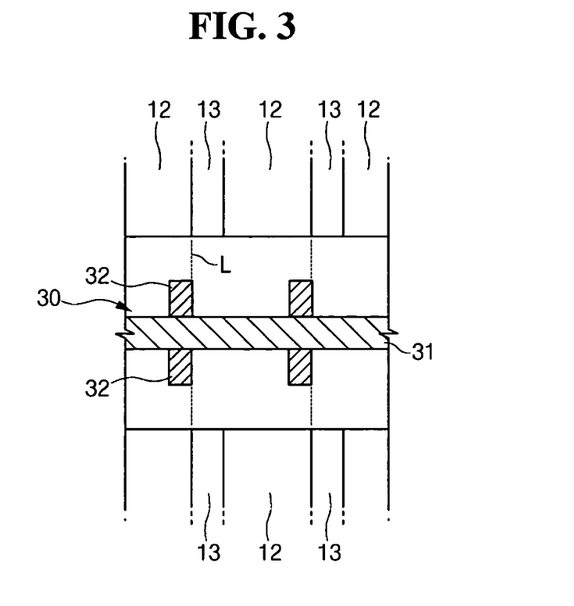
FIG. 3 is a schematic amplified view of representative structural components of the battery module according to the first embodiment of the present invention.

Furthermore, as shown in FIG. 3, the protrusions 32 are all aligned to the edge end lines L of the unit cells 12 of the cell assemblies 11.

The edge end line L of the unit cell is defined by the line rectilinearly extended from the lateral side of the unit cell 12 directed toward the coolant air inflow side of the respective unit cells.

That is, the lateral side of the protrusion 32 directed toward the inflow side receiving the cooling air is aligned to the edge end line L of the unit cell 12.

The cooling air flow along the air inlet 23 is interrupted by the protrusions 32, and the flow direction thereof is changed. In this process, directed cooling air elements are made, and guided toward the cell assemblies 11. As the protrusions 32 are aligned to the unit cells 32 each on the same line, the guided cooling air circulates through the barriers 13 between the unit cells more fluently.

Of course, the installation location of the protrusions 32 with respect to the guide plate 31 is not limited to the above structure, and various structures may be applied thereto.

Figure 4:
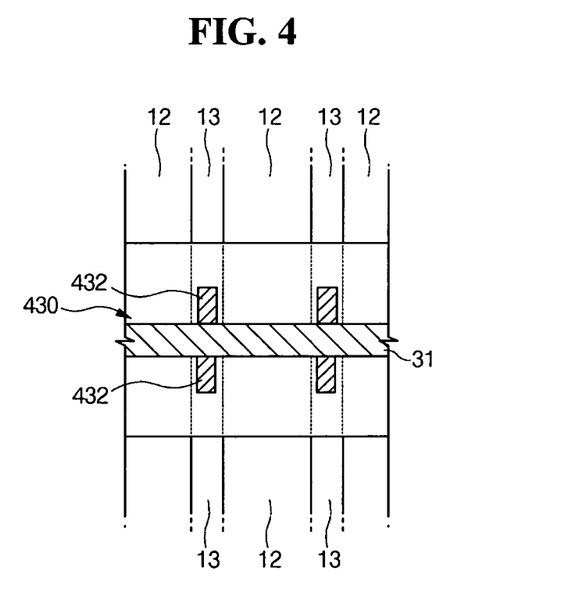
FIG. 4 is a schematic amplified view of representative structural components of a battery module according to a second embodiment of the present invention.

FIG. 4 shows a guidance unit of a battery module according to another embodiment of the present invention.

For explanatory convenience, like reference numerals will be used to indicate the same structural components as those of the previously described.

With the housing 430 according to the present embodiment, the installation location of the protrusions 432 is altered. That is, as shown in FIG. 4, the protrusions 432 are placed in-between the unit cell neighbors 12 of the cell assemblies 11.

As the barrier 13 is disposed between the unit cell neighbors 12, the protrusions 432 are positioned corresponding to the barriers 13, respectively.

Figure 5:
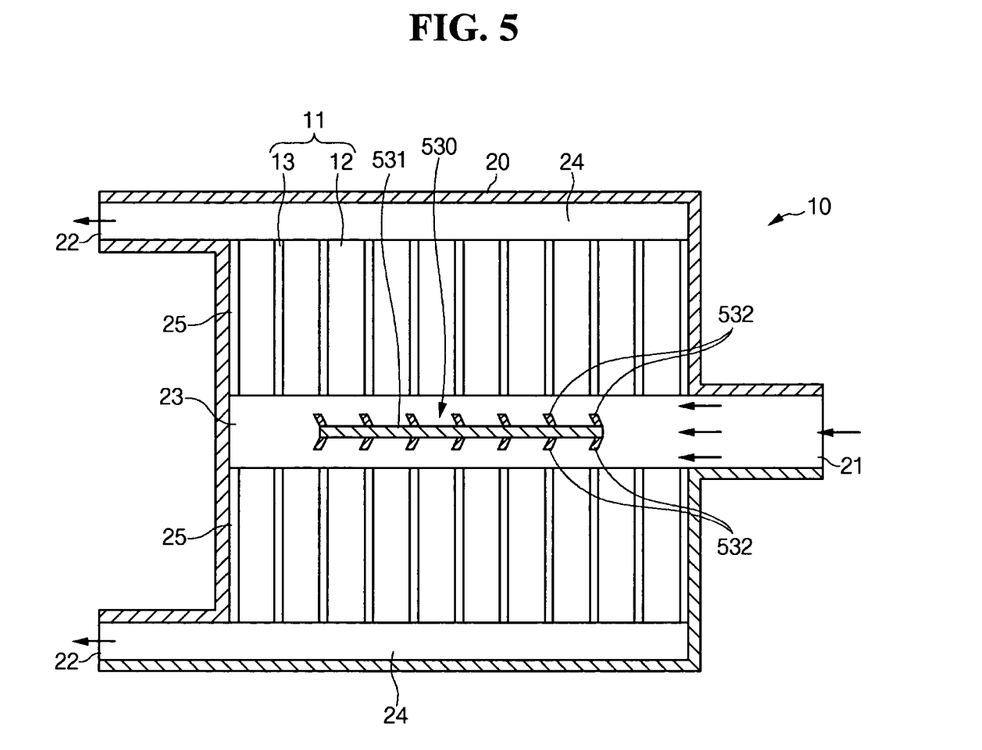
FIG. 5 is a schematic plan elevation view of a battery module according to a third embodiment of the present invention.
Figure 6:
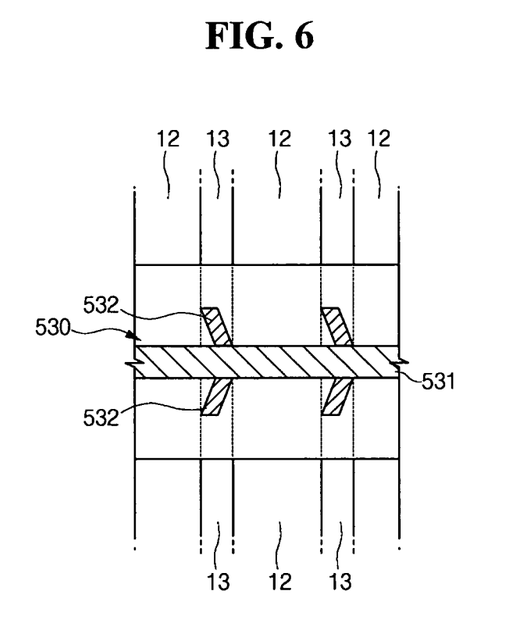
FIG. 6 is a schematic amplified view of representative structural components of the battery module according to the third embodiment of the present invention.

Referring now to FIGS. 5 and 6, there is shown a battery module according to still another embodiment of the present invention.

In this embodiment, like reference numerals will be used to indicate the same structural components as those of the previously described.

The battery module 10 according to the present embodiment belongs to the blower type. An inlet hole 21 and an air inlet 23 are placed at the center of the housing 20, and outlet holes 22 and air outlets 24 are formed at both sides of the housing 20. A guidance unit 530 is placed at the center of the air inlet 23, and extended longitudinally such that both ends thereof are roughly positioned at both end portions of the cell assemblies. The guidance unit 530 guides the cooling air flow along the air inlet 23.

The guidance unit 530 is formed with a plate structure, which is located at the internal center of the air inlet 23 in the longitudinal direction thereof. The guidance unit 530 has a flat guide plate 531, and protrusions 532 protruded from both lateral surfaces of the guide plate 531 toward the respective cell assemblies 11. The protrusions 532 are spaced apart from each other, and at an oblique angle to the guide plate 531.

With the guidance unit 530, the guide plate 531 proceeds substantially parallel to the cell assemblies 11, while the protrusions 532 protrude from the guide plate 531 at an oblique inclination angle and are directed toward the cell assemblies 11. The protrusions 532 protrude from the guide plate 531 in the direction of flow of the cooling air. The inclination angle of the protrusions is not limited to any specific angle.

Furthermore, as shown in FIG. 6, the protrusions 532 may be placed in-between the unit cell neighbors 12 of the cell assemblies 11.

As the barrier 13 is disposed between the unit cell neighbors 12, the protrusions 532 are positioned corresponding to the barriers 13, respectively.

The operation of the above-structured battery module will be now explained in detail.

When a pump connected to the inlet hole 21 is driven, the temperature control air is introduced into the housing 20 via the inlet hole 21. The temperature control air flows in along the air inlet 23, passes through the respective cell assemblies 11, and then flows out along the air outlet 24 and is discharged to the outside via the outlet hole 22.

The cooling air is bisected by the guidance unit 30 at the input side of the air inlet 23 connected to the inlet hole 21. One of the bisected cooling air elements is directed toward the one-sided cell assembly 11, and the other toward the other-sided cell assembly 11.

As the sectional area of the air inlet 23 is reduced due to the guide plate 31 and the protrusions 32 of the guidance unit 30, the cooling air circulated through the respective cell assemblies 11 does not proceed speedily toward the inner end of the air inlet 23, and accordingly, a sufficient amount of the cooling air circulates through the inlet hole-sided unit cells of the cell assemblies 11.

Furthermore, when the cooling air meets the protrusions 32 protruding toward the respective unit cells of the cell assemblies 11 with respect to the air inlet 23, it does not proceed quickly along the air inlet 23, and by going over the protrusions 32, directional elements of the cooling air are guided toward the cell assemblies. The flow of the cooling air guided toward the cell assemblies 11, can thereby circulate through the unit cells fluently.

A sufficient amount of the cooling air flow provided along the air inlet 23 circulates through the inner end-sided unit cells as well as the outer inlet hole-sided unit cells so that it is uniformly distributed over the respective unit cells 12 of the cell assemblies 11. Therefore, the cooling air evenly flows in to the respective barriers 13 along the length of the cell assemblies 11 so that it circulates through the entire area of the cell assemblies 11, thereby making the temperature distribution of the whole unit cells of the cell assemblies 11 uniform.

Figure 7:
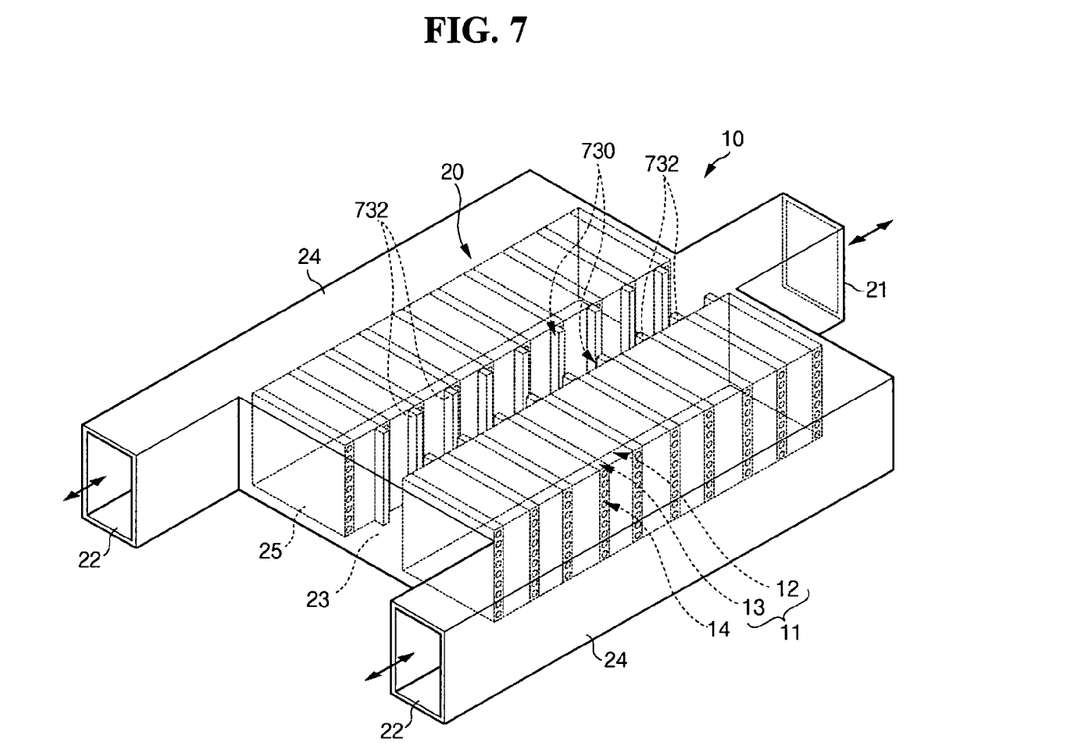
FIG. 7 is a schematic perspective view of a battery module according to a fourth embodiment of the present invention.
Figure 8:
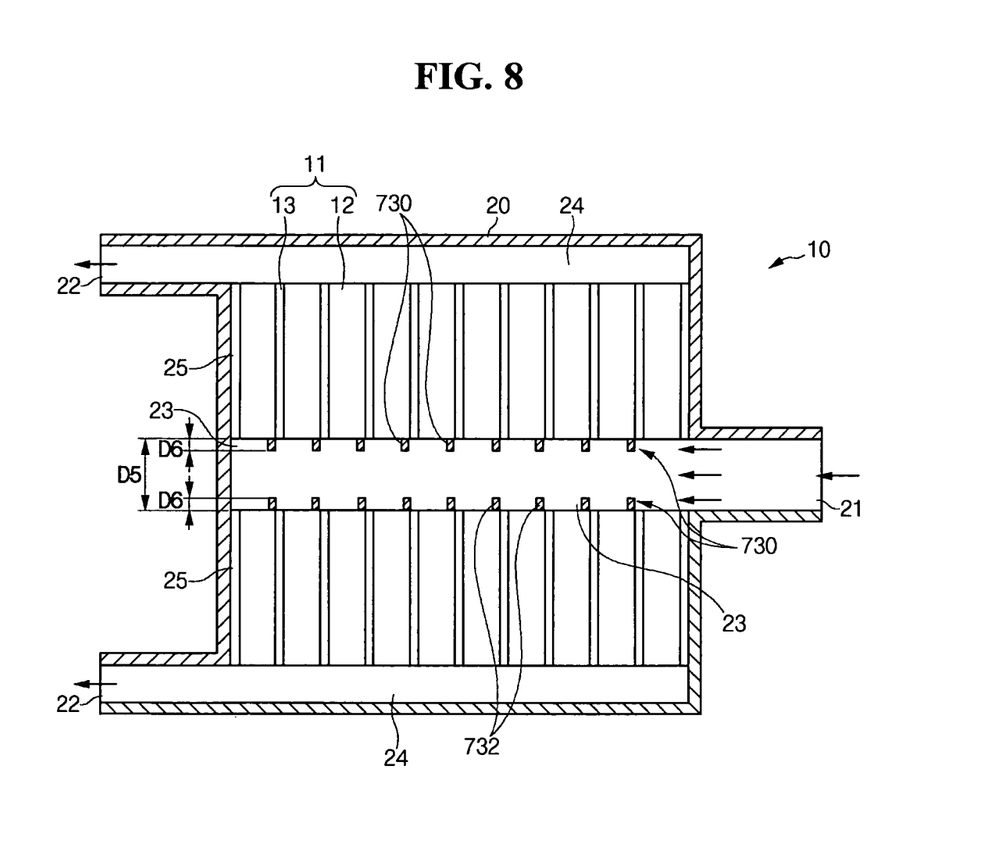
FIG. 8 is a schematic plan elevation view of the battery module according to the fourth embodiment of the present invention.
Figure 9:
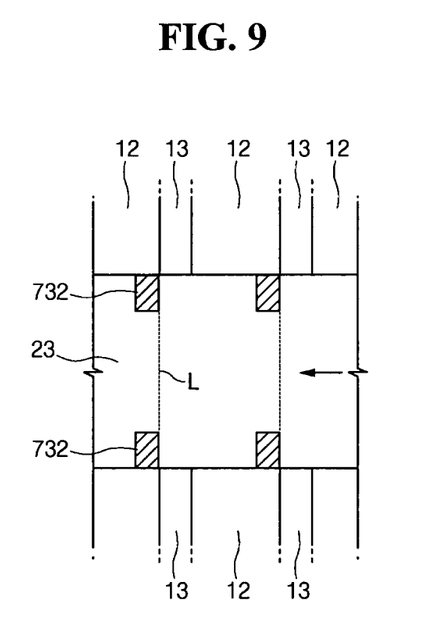
FIG. 9 is a schematic plan elevation view of representative structural components of the battery module according to the fourth embodiment of the present invention.

Referring now to FIGS. 7 to 9, there is shown a guidance unit of a battery module according to still another embodiment of the present invention.

The guidance unit 730 is formed with side protrusions 732, which are substantially perpendicular to the direction of input flow of the cooling air while being tightly adhered to the unit cells 12 of the cell assemblies 11 contacting the air inlet 23, and protruding toward the air inlet 23.

The side protrusions 732 are located in one to one correspondence with the unit cells 12 of the cell assemblies 11, and protrude substantially perpendicular to the longitudinal direction of the air inlet 23.

Since the side protrusions 732 protrude toward the air inlet 23, the cooling air is interrupted in flow by the side protrusions 732, and flows in between the unit cells 12 of the cell assemblies 11 placed at both sides of the air inlet 23.

The cooling air may be forcefully guided to the inlet hole-sided unit cells 12 so that those inlet hole-sided unit cells 12 are cooled sufficiently by the guided cooling air. Consequently, the inter-unit cells temperature deviation and local temperature elevation of the cell assemblies are minimized.

The protruding degree of the side protrusions 732 with respect to the width direction of the air inlet 23 is not limited. In an exemplary embodiment the protruding degree D6 of the side protrusion 732 is 25-35% of the sectional width D5 of the air inlet 23.

When the protruding degree of the side protrusion 732 is less than 25% of the sectional width of the air inlet 23, it is difficult to guide the cooling air to the inlet hole-sided unit cells 12. By contrast, when the protruding degree of the side protrusion 732 exceeds 35% of the sectional width of the air inlet 23, the cooling air does not flow fluently.

The side protrusions 732 protruding toward the air inlet 23 merely interrupt the flow of the cooling air and guide it to the cell assemblies 11. Therefore, the thickness of the side protrusions in the direction of flow of the cooling air is not limited.

Furthermore, as shown in FIG. 9, the side protrusions 732 are all aligned to the edge end lines L of the unit cells 12 of the cell assemblies 11.

The edge end line L of the unit cell is defined by the line rectilinearly extended from the lateral side of the unit cell 12 directed toward the inflow side receiving the cooling air.

Accordingly, the lateral side of the side protrusion 732 directed toward the inflow side receiving the cooling air is aligned to the edge end line L of the unit cell 12.

The cooling air flow along the air inlet 23 is interrupted by the side protrusions, and the flow direction thereof is changed. In this process, directed cooling air elements with respect to the longitudinal direction of the air inlet 23 are made, and guided toward the cell assemblies 11.

As the side protrusions 732 are aligned to the unit cells 32 each on the same line, the guided cooling air circulates more fluently through the barriers 13 placed between the unit cells 12.

Of course, the installation location of the side protrusions 732 is not limited to the above structure, and various structures may be applied thereto.

Figure 10:
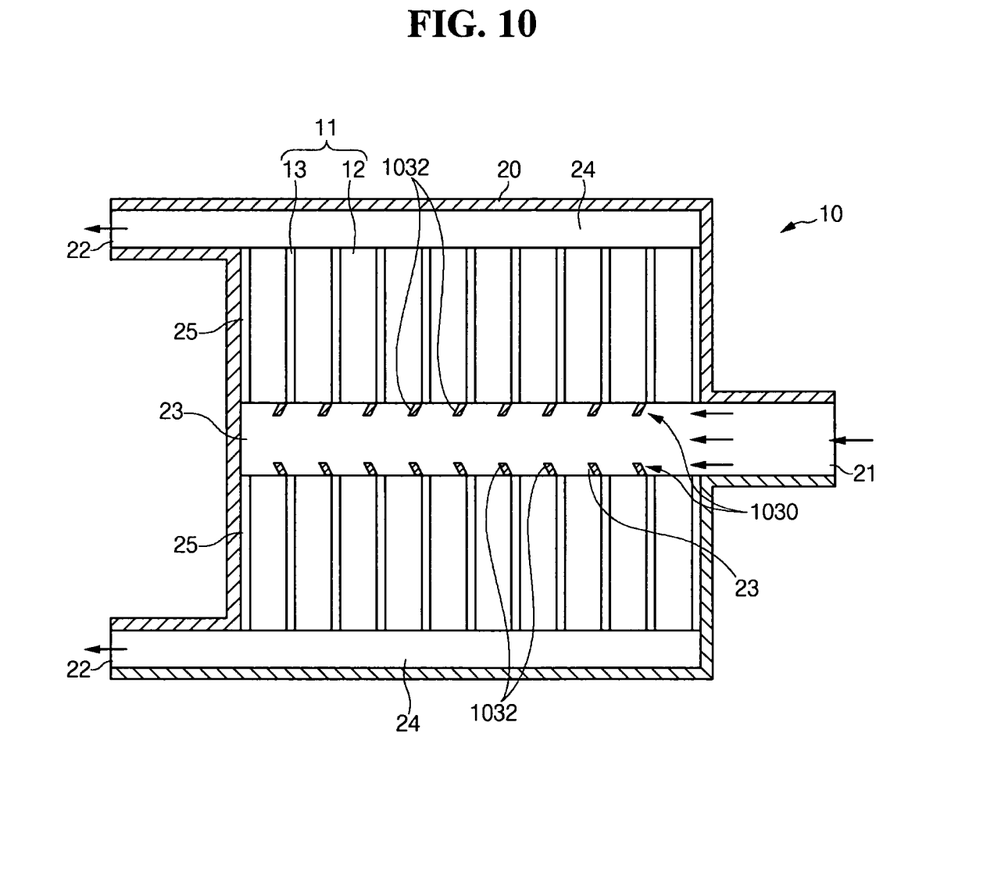
FIG. 10 is a schematic plan elevation view of a battery module according to a fifth embodiment of the present invention.

FIG. 10 shows a guidance unit of a battery module according to still another embodiment of the present invention.

In this embodiment, like reference numerals will be used to indicate the same structural components as those of the previously described.

The guidance unit 1030 is formed with side protrusions 1032 tightly adhered to the unit cells 12 of the cell assemblies 11 contacting the air inlet 23, and protruding toward the air inlet 23.

The side protrusions 1032 are standing with respect to the direction of flow of the cooling air, and are tightly adhered to the unit cells 12 of the cell assemblies 11 contacting the air inlet 23. The side protrusions 1032 protrude toward the air inlet 23 while being inclined to the face of the unit cells. That is, the side protrusions are at an oblique angle to the unit cells. The side protrusions 1032 incline toward the direction of flow of the cooling air.

The inclination angle of the side protrusion 1032 is not limited to any specific amount.

The operation of the battery module will be now explained in detail.

When a pump connected to the inlet hole 21 is driven, the temperature control air is introduced into the housing 20 via the inlet hole 21. The temperature control air flows in along the air inlet 23, and passes through the respective cell assemblies 11, followed by the air flowing out along the air outlet 24 and being discharged to the outside via the outlet hole 22.

As the cooling air is interrupted in flow by the side protrusions 1032 at the input side of the air inlet 23 connected to the inlet hole 21, it does not speedily flow in to the inner end of the air inlet 23, and accordingly, a sufficient amount of the cooling air circulates through the inlet hole-sided unit cells 12 of the cell assemblies 11.

Furthermore, when the cooling air meets the side protrusions 1032 protruded from the respective unit cells 12 toward the air inlet 23 and goes over the side protrusions 1032, some directional elements of the cooling air are directed toward the cell assemblies.

Accordingly, the cooling air is guided in flow toward the cell assemblies 11, thereby circulating through the unit cells 12 thereof fluently.

Therefore, a sufficient amount of the cooling air flow along the air inlet 23 circulates through the inner end-sided unit cells as well as the outer inlet hole-sided unit cells so that it is uniformly distributed over the respective unit cells 12 of the cell assemblies 11.

Consequently, the cooling air evenly flows in to the respective barriers 13 along the length of the cell assemblies 11 so that it circulates evenly through the entire area of the cell assemblies 11, thereby making the temperature distribution of the whole unit cells 12 of the cell assemblies 11 uniform.

As described above, with a battery module according to an embodiment of the present invention, the circulation structure of the temperature control air is improved to thereby heighten the cooling efficiency of the battery module. As the temperature control air circulates evenly through the respective unit cells, the problem of local thermal unbalance is solved over the entire area of the battery module.

Although exemplary embodiments of the present invention have been described, the present invention is not limited to the embodiments and examples, but may be modified in various forms without departing from the scope of the appended claims, the detailed description, and the accompanying drawings of the present invention. Therefore, such modifications belong to the scope of the present invention as defined by the appended claims and their equivalents.

What is claimed is:

1. A battery module comprising:
a plurality of cell assemblies spaced from each other, each of the cell assemblies having a plurality of unit cells being stacked in a first direction;
a housing for mounting the cell assemblies within the housing, the housing having a cooling medium passage for a cooling medium and an inlet, wherein the inlet does not overlap with any of the unit cells in the first direction; and
a guidance unit located between and spaced from each of the cell assemblies in the cooling medium passage to guide flow of a cooling medium along the cooling medium passage toward the cell assemblies, the guidance unit comprising:
a guide plate extending in the first direction; and
a plurality of protrusions that are spaced from each other and protrude from the guide plate toward the one or more cell assemblies.

2. The battery module of claim 1, wherein the guidance unit is placed in the cooling medium passage for in-flowing the cooling medium.

3. The battery module of claim 1, wherein the guidance unit is placed in-between end portions of the cell assemblies.

4. The battery module of claim 1, wherein the protrusions are formed along the guide plate such that the protrusions are aligned to lateral sides of the unit cells directed toward an inflow side receiving the cooling medium.

5. The battery module of claim 1, wherein the protrusions are formed along the guide plate such that the protrusions are placed in-between unit cell neighbors of the one or more cell assemblies.

6. The battery module of claim 1, wherein the protrusions protrude substantially perpendicular to the guide plate.

7. The battery module of claim 1, wherein the protrusions are at an oblique angle to the guide plate.

8. The battery module of claim 1, wherein the housing includes:
an inlet hole formed at one end of the housing to introduce the cooling medium into the housing;
discharge holes formed at an other end of the housing to discharge the cooling medium circulating through the respective unit cells;
an inlet passage formed at a coolant flow input side of the cell assemblies and communicating with the inlet hole; and
an outlet passage formed at a coolant flow output side of the cell assemblies and communicating with the discharge holes.

9. The battery module of claim 1, wherein a pair of the cell assemblies face each other within the housing, and an inlet hole and an inlet passage are formed at the center of the housing, while an outlet passage and an outlet hole are formed at both sides of the housing.

10. A battery module comprising:
one or more cell assemblies, each having a plurality of unit cells being stacked in a first direction;

a cell barrier between adjacent unit cells of the one or more cell assemblies, the cell barrier comprising at least one channel;

a housing for mounting the one or more cell assemblies within the housing, the housing having a cooling medium passage configured to allow a flow of a cooling medium in the first direction and an inlet, wherein the inlet does not overlap with any of the unit cells in the first direction; and a guidance unit installed in the cooling medium passage to change the flow of the cooling medium along the cooling medium passage from the first direction to a second direction toward the cell barrier, the guidance unit comprising a plurality of protrusions protruding from the cell assemblies toward the cooling medium passage to guide the cooling medium to the cell assemblies.

11. The battery module of claim 10, wherein the protrusions are placed in the cooling medium passage for in-flowing the cooling medium.

12. The battery module of claim 10, wherein the protrusions are arranged along the cooling medium passage and spaced apart from each other.

13. The battery module of claim 10, wherein the protrusions are positioned corresponding to the respective unit cells of the cell assemblies.

14. The battery module of claim 10, wherein the protrusions are aligned to lateral sides of the unit cells directed toward an inflow side receiving the cooling medium.

15. The battery module of claim 10, wherein the protrusions protrude substantially perpendicular to the first direction.

16. The battery module of claim 10, wherein the protrusions protrude at an oblique inclination angle with respect to the cooling medium passage.

17. The battery module of claim 10, wherein the housing includes:

an inlet hole formed at one end of the housing to introduce the cooling medium into the housing;

discharge holes formed at an other end of the housing to discharge the cooling medium circulating through the respective unit cells;

an inlet passage formed at a coolant flow input side of the one or more cell assemblies and communicating with the inlet hole outlet holes; and an outlet passage formed at a coolant flow output side of the one or more cell assemblies and communicating with the discharge holes.

18. The battery module of claim 10, wherein a pair of the cell assemblies face each other within the housing, and an inlet hole and an inlet passage are formed at the center of the housing, while an outlet passage and an outlet hole are formed at both sides of the housing.

* * * * *